United States Patent [19]
Robbins

[11] 4,114,642
[45] Sep. 19, 1978

[54] WATER CLOSET VALVE ASSEMBLY

[76] Inventor: Robert Ralph Robbins, 62 Thatcher Dr., Winnipeg, Manitoba, Canada

[21] Appl. No.: 764,812

[22] Filed: Feb. 2, 1977

Related U.S. Application Data

[63] Continuation-in-part of Ser. No. 561,839, Mar. 25, 1975, abandoned.

[51] Int. Cl.² ............................................. F16K 31/24
[52] U.S. Cl. .................... 137/436; 137/446; 137/451
[58] Field of Search ............... 137/409, 414, 435, 436, 137/441, 442, 446, 451; 251/50, 61.1, 61.2, 120, 251, 259, 45, 46

[56] References Cited

U.S. PATENT DOCUMENTS

| 1,338,179 | 4/1920 | Hohmeister | 137/451 |
| 1,724,940 | 8/1929 | Jones | 137/446 |
| 2,412,397 | 12/1946 | Harper | 251/251 |
| 2,772,066 | 11/1956 | Keeton et al. | 251/46 |
| 2,811,169 | 10/1957 | Buchanan | 251/46 |
| 3,011,515 | 12/1961 | Kravagna | 137/436 |
| 3,211,172 | 10/1965 | Parkison | 137/451 |
| 3,729,017 | 4/1973 | Brandelli | 137/414 |
| 3,760,839 | 9/1973 | Hyde | 137/414 |
| 3,939,728 | 2/1976 | Wallstein | 137/451 |

Primary Examiner—Martin P. Schwadron
Assistant Examiner—G. L. Walton
Attorney, Agent, or Firm—Stanley G. Ade

[57] ABSTRACT

Most valve assemblies used in water closet tanks are relatively bulky and often interfere with the operative action of the tank. Furthermore, such valve assemblies are noisy in operation and "wire drawing" effects cause considerable wear of the valve seat and/or valve. This device includes a flexible diaphragm engageable with an annular valve seat and acting as a valve between the water intake and the interior of the tank. A spherical segment cam is mounted in the assembly operatively connected to a float and connecting rod moving reciprocally. The cam operates a plug sliding reciprocally in the body of the valve assembly, said plug engaging the diaphragm and controlling the opening and closing of the diaphragm with the valve seat. The mechanical advantage of the spherical segment cam gives a positive closing action plug minimizing the "wire drawing" effect and the construction of the diaphragm and associated parts eliminates thumping and hissing during the closing action. An adjustable volume water trap feed is incorporated in the valve assembly so that the amount of water passing through to the water trap is adjustable within limits.

26 Claims, 18 Drawing Figures

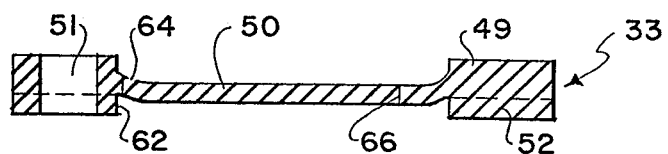
FIG. 8
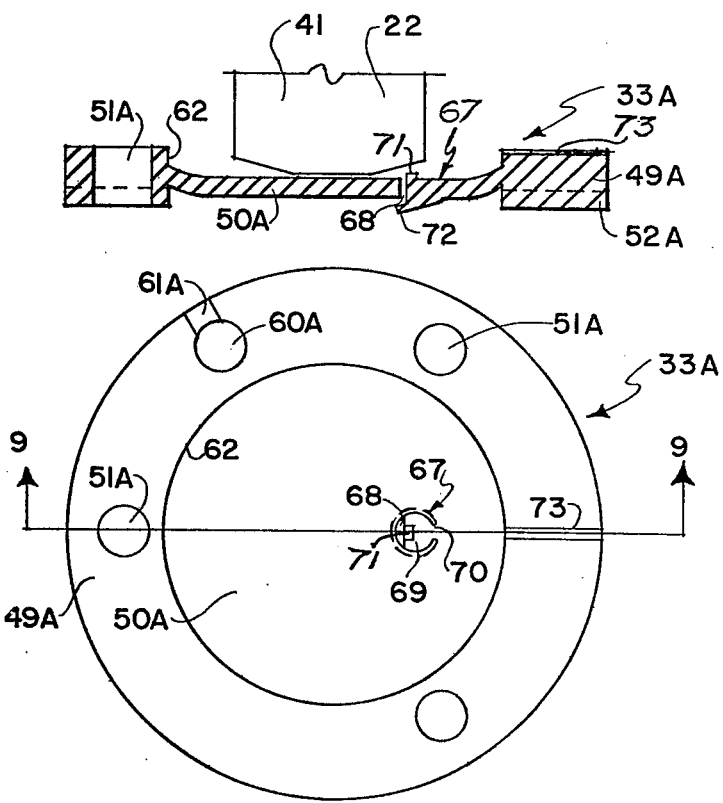
FIG. 9
FIG. 10

WATER CLOSET VALVE ASSEMBLY

BACKGROUND OF THE INVENTION

This invention relates to new and useful improvements in float valve assemblies for the tanks of water closets and the like and constitutes a Continuation-in-Part application of United States application, Ser. No: 561,839 filed Mar. 25th, 1975, now abandoned.

Conventionally, such float valve assemblies incorporate a float with a substantially horizontal arm actuating a conventional valve assembly which controls the level of water within the tank. When the tank is flushed, the float falls thus opening the valve and letting water into the tank to replace the water drained therefrom. As the water level in the tank rises, the float rises and gradually closes off the valve assembly. As the valve assembly approaches the closed position, considerable noise is evident in the form of thumping or hissing and a condition known as "wire drawing" often occurs when the valve is almost closed which causes considerable wear to occur at the valve and seat interface.

SUMMARY OF THE INVENTION

The present invention overcomes the disadvantages inherent with conventional float valve assemblies by providing a relatively simple construction which is accomplished by the reduction of comsumption of materials. The device comprises a flexible diaphragm extending over a valve seat and being actuated by a plunger which in turn is operatively connected to the float arm.

The relationship of the parts is such that the diaphragm is held off the seat with increasing resistance until it more or less "snaps" shut thus eliminating "wire drawing" and, due to the flexibility and arrangement of the diaphragm, eliminates the majority of noise usually associated with conventional valve assemblies.

Furthermore, the space requirement for the present mechanism is reduced so that it can be mounted in a more restricted space and the entire assembly can be mounted on the side of the outflow tube of the flush valve assembly remote from the operating parts thereof so that no interference occurs between the two.

The principle object and essence of the invention is to provide a device of the character herewithin described in which the valve diaphragm includes means for adjusting the pressure difference between the two sides of the diaphragm membrane whereby the diaphragm is closed onto the valve seat by a combination of hydraulic and mechanical forces in which the addition of the hydraulic component reduces the mechanical component thereby permitting reduction of the length of the actuating lever in the restricted area of the tank.

A further object of the invention is to provide a device of the character herewithin described which utilizes a flexible diaphragm and mechanism arranged so that "wire drawing" is eliminated together with the associated noise normally inherent in conventional float valve assemblies.

Another object of the invention is to provide a device of the character herewithin described in which the float valve assembly can be mounted on one side of the overflow tube of the flush valve assembly remote from the operating parts thereof.

A yet further object of the invention is to provide a device of the character herewithin described in which the valve remains fully closed if the water supply is shut off and the float is at its lowermost position thus eliminating back flow of water from the tank to the water supply system. Another embodiment may be situated above the upper end of the overflow pipe once again eliminating any possibility of siphoning or back flow from occurring.

A still further object of the invention is to provide a device of the character herewithin described which utilizes considerably less material and parts than is used in the construction of conventional water closet float valve assemblies.

Still another object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

BRIEF DESCRIPTION OF THE DRAWINGS

FIG. 8 is a cross sectional view along the line 8—8 of FIG. 5.

FIG. 9 is a cross sectional view of an alternative design of the diaphragm taken along the line 9—9 of FIG. 10.

FIG. 10 is a top plan view of FIG. 9.

In the drawings like characters of reference indicate corresponding parts in the different figures.

BRIEF DESCRIPTION OF THE INVENTION

Figure 1:
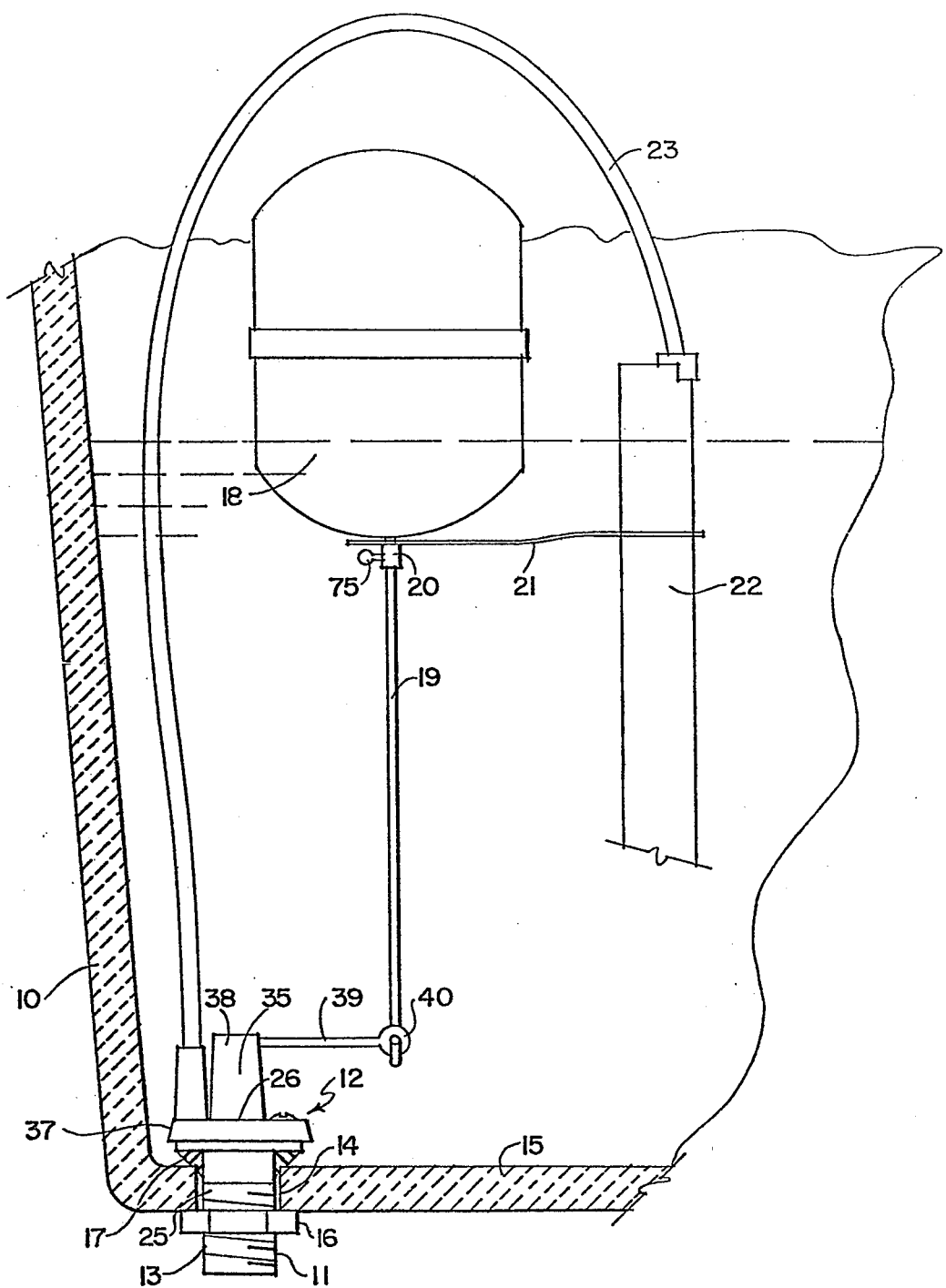
FIG. 1 is a fragmentary sectional view of one end of a water closet tank showing the device in position together with the float and overflow tube assembly.
Figure 4:
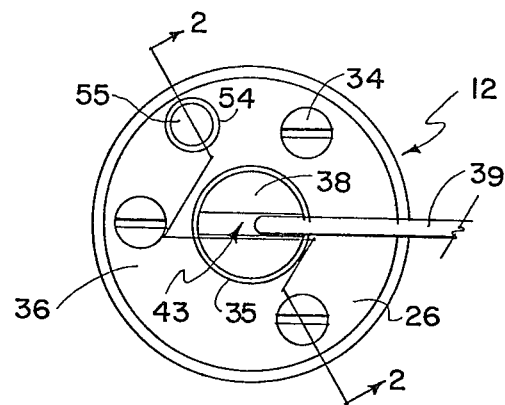
FIG. 4 is a top plan view of the valve assembly.

Before proceeding with the detailed description of the invention, reference should first be made to FIG. 1 in which 10 illustrates a portion of a water closet tank with a water inlet connection 11 being situated adjacent one end wall of the tank, said connection forming part of the valve assembly collectively designated 12. The water connection takes the form of a relatively shot externally screw threaded tube 13 engaged through an aperture 14 in the base 15 of the tank and being sealably clamped in position by means of nut 16 and a sealing washer 17, all of which are basically conventional.

A float 18 adjustably connects to a vertically situated connecting rod 19 by means of collar and thumb screw 20 with the upper end of the connecting rod 19 passing through an aperture in a flexible strip 21 which extends from and is supported by the conventional overflow tube 22 so that as the float rises and falls, the flexible strip 21 flexes thus supporting the float 19 and maintaining same in the substantially vertical position. A water feed tube 23 connects to the upper end of the overflow tube 22 and extends to the valve assembly 12 and supplies water through the overflow tube assembly, to the water trap normally situated within the toilet bowl (not illustrated). This tube 23 connects to the valve assembly 12 as will hereinafter be described.

DETAILED DESCRIPTION

Figure 2:
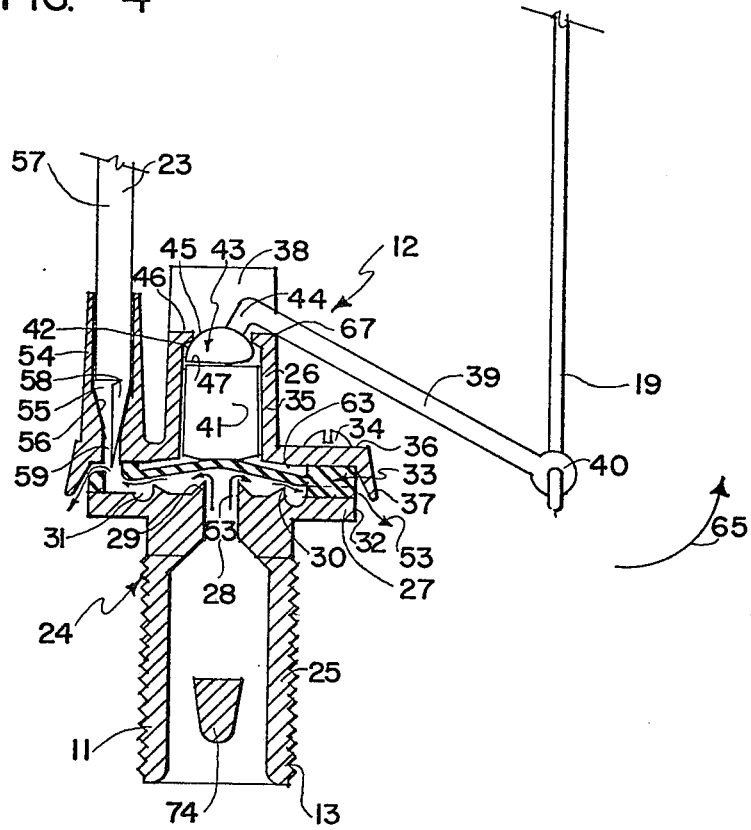
FIG. 2 is an enlarged fragmentary cross sectional view of the valve assembly per se with the valve assembly in the open position, substantially along the line 2—2 of FIG. 4.
Figure 3:
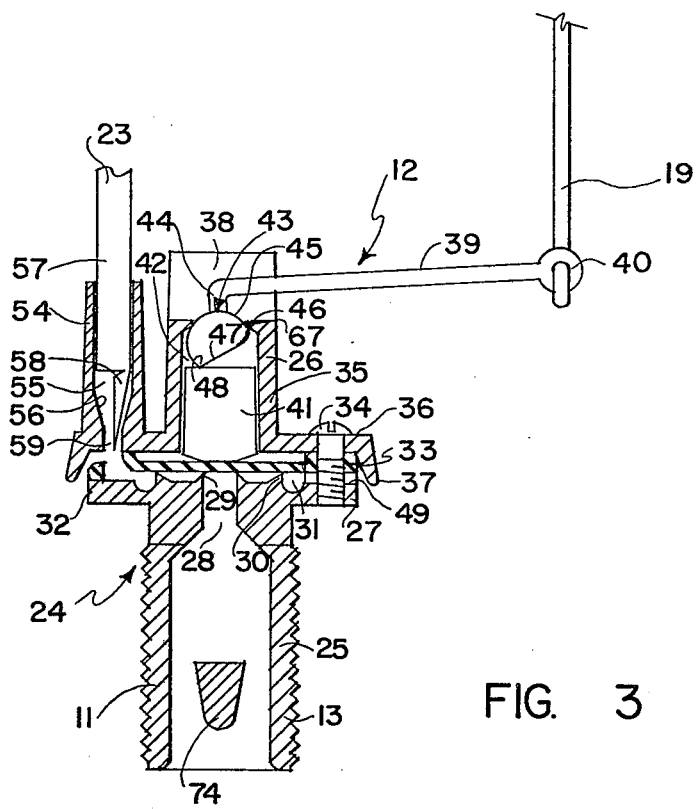
FIG. 3 is a view similar to FIG. 2 but showing the valve in the closed position.

In detail, reference should be made to FIGS. 2 and 3 which show the valve assembly 12 in cross section.

It comprises a body portion collectively designated 24, said body portion including a lower of first portion 25 and an upper or second portion 26. The lower portion includes the aforementioned threaded sleeve or tube 13 terminating in a substantially planar disc 27. The upper end of the inside of the sleeves or tube 13 narrows to a central bore 28 which opens up onto the disc 27 and an annular valve seat 29 extends around the upper end of bore 28 and extends above plane of the planar disc 27.

Spaced concentrically outwardly from the valve seat 29 is an annular rib 30, the elevation of which is slightly less than the elevation of the valve seat 29 and outboard of this rib is an annular cavity 29A which includes a channel 31 also concentric with the seat 29. This annular channel is spaced inwardly from the outer edge 32 of the disc 27.

A diaphragm collectively designated 33 is clamped between the disc 27 and the upper portion 26 of the body by means of screws 34 and details of this diaphragm will be hereinafter described.

The upper portion 26 includes a hollow cylindrical portion 35 having an outwardly extending flange 36 formed on the lower or inner end thereof through which screws 34 extend. An outwardly and downwardly extending deflector 37 is situated on the outer perimeter of the flange 36, the purpose of which will hereinafter be described.

A pair of spaced and parallel vertically situated flanges 38 extend upwardly from the upper end of the portion 35 and act as guides for an arm 39 pivotally connected by the outer end thereof to the lower end of the connecting rod 19, said pivotal connection being indicated by reference character 40.

A lightweight cylindrical valve actuating plug 41 slidably engages within the bore 42 within the portion 35, said plug being preferably made of plastic, and the lower end of this plug engages the upperside of the diaphragm 33.

A substantially spherical or curved surfaced segment cam component collectively designated 43 is secured to the inner end of the arm 39, said inner end being downturned at right angles to the arm as indicated by reference character 44. This downturned end 44 is secured to the curved upper surface 45 of the cam component which is mounted for partial rotation within a cam seat 46 formed on the upper end of the portion 35 as clearly illustrated.

The lower chordal surface 47 of the cam component is peneplain shaped or slightly curved and engages the upper end of the plug 41.

From the foregoing and with reference to FIGS. 2 and 3, it will be seen that when the float is in the uppermost position as indicated by the arm 39 in FIG. 3, the spherical cam is rotated so that the junction 48 between the planar lower surface 47 and the curved surface 45, engages the plug 41 and moves same downwardly thus engaging the diaphragm upon the valve seat 29 and closing off the water supply flowing through the conduit or sleeve 13. Conversely, when the float is in the lowermost position as indicated by the position of arm 39 in FIG. 2, the spherical cam is in the position shown in FIG. 2 with the majority of the flat or lower surface 47 engaging the upper end of the plug 41. This allows the water pressure present at the conduit 13, to raise the diaphragm from the seat and allow water to flow into the tank as will hereinafter be described.

Figure 5:
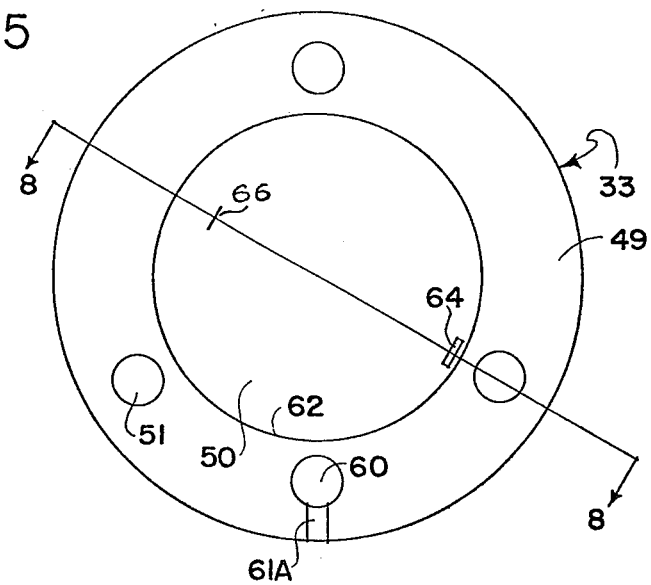
FIG. 5 is a top plan view of the diaphragm per se.
Figure 6:
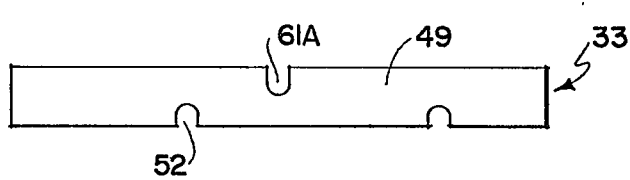
FIG. 6 is a side elevation of FIG. 5.
Figure 7:
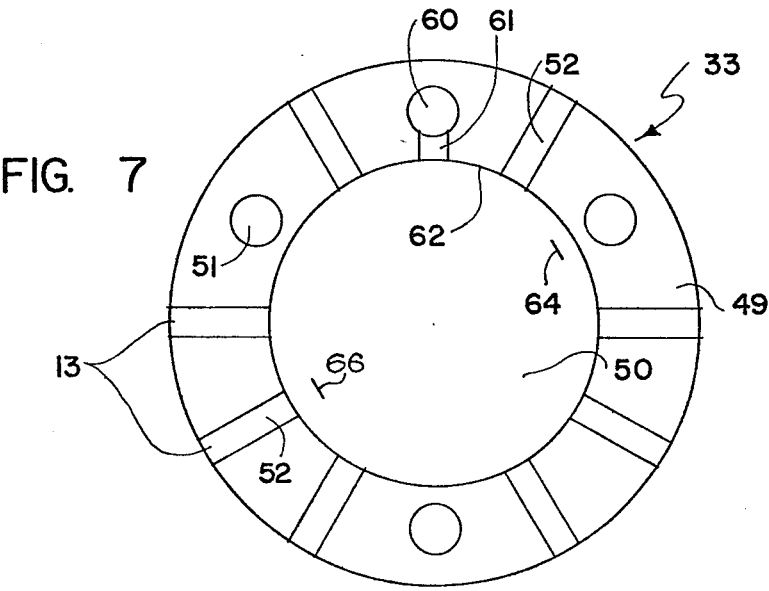
FIG. 7 is an underside view of FIG. 6.

Details of the diaphragm 33 are shown in FIGS. 5 to 8. It comprises an annular mounting portion 49 and a membrane 50 extending across the area bounded by the mounting portion. The diaphragm is made from an elastomeric material and is flexible and is formed preferably with the membrane biassed downwardly with reference to FIG. 8 so that the tendency of the membrane is to return to the position shown in FIG. 8. A plurality of apertures 51 are provided through the mounting portion through which screws 34 engage and a plurality of radially extending channels or grooves 52 are formed on the underside of the mounting portion as shown in FIGS. 6 and 7. When installed, these grooves from a water communication between the annular channel 31 and the interior of the tank 10 as indicated by arrows 53 in FIG. 2.

Before proceeding with the further construction of the diaphragm and action thereof, reference should be made to FIGS. 1 and 2 in which details are shown of the feed to the conduit 23 which supplies water for the water trap.

A hollow cylindrical boss 54 extends upwardly from one side of the upper portion 26 of the body and this boss includes a bore 55 having a wedge shaped or inwardly tapered lower end 56.

The lower end 57 of the tube or conduit 23 is cut away to form a downwardly extending flexible tongue 58 and this lower end 57 is frictionally engaged within the boss 54 so that the tongue engages the surface 56. By adjusting the relationship of the conduit 57 with the boss 54, the lower end of the tongue can control the area of the lower end 59 of the bore of the boss thus controlling the volume of water flowing therethrough and therefore controlling the volume of water which is fed to the water trap on each operation of the toilet.

In this connection, reference should once again be made to FIGS. 5 through 8 illustrating the diaphragm 33.

An aperture or hole 60 extends through the mounting portion 49 and a relatively short groove or channel 61 extends from the inner side or wall 62 of the mounting portion, to this aperture or hole 60 thus communicating with the annular channel 31 and allowing water to pass from this annular channel, through the groove 61 to the aperture 60 which is in alignment with the underside of the boss 54 and thus in alignment with the entrance 59 to the feed to the conduit 23.

When the float is in the lowermost position as shown in FIG. 2, water under pressure is supplied to the valve action through the threaded tubular connection 13. This water impinges upon the underside of the diaphragm membrane 50 thus resulting in a pressure build-up in the area immediately below the diaphragm bounded by the rib 30. The membrane moves upwardly to the position shown in FIGS. 2 and 11 thus allowing water to flow radially outwardly between the rib 30 and the membrane 50 into the annular channel 31 from which it passes through the grooves or channels 52 formed in the underside of the mounting portion 49 of the diaphragm whereupon it impinges against the annular deflecting rim 37 hereinbefore described and then enters the tank.

At the same time, of course, water passes through the aperture or drilling 60 into the conduit 23 as hereinbefore described, the volume being adjustable by the positioning of the lower end of the conduit.

It should also be noted that the hole or drilling 60 is provided with a discharge slot 61A on the upper side of the mounting portion 49 which permits a portion of the water passing the boss 54, to discharge into the tank thereby reducing the pressure in this area and facilitating the adjustment of the water flow into the tubing 23 and reducing turbulence.

Figure 11:
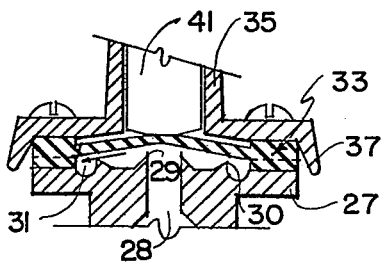
FIG. 11 is an enlarged fragmentary partially schematic view of the diaphragm in position and in the wide open position.

When the diaphragm is moved upwardly as hereinbefore described and as illustrated in FIGS. 2 and 11, water present in the space or volume above the diaphragm (indicated by reference character 63) has to be displaced. This is done either by leakage between the plug 41 and the wall of the portion 26 and past the spherical cam 43, or by passing downwardly through a variable orifice 64 formed in the membrane 50 of the diaphragm, this orifice being referred to as a pressure adjusting valve.

This orifice is situated between the inner wall 62 of the mounting portion 49 and the portion of the diaphragm engaging the annular rib 30 and is a wedge shaped slit formed in the membrane with the wide end of the wedge at the upper face of the membrane (see FIGS. 5 and 8). It is located in an area of maximum flexing of the membrane as the latter moves upwardly and downwardly and when the membrane is in the position shown in FIG. 2, the lower face of the membrane is distended so that the orifice or slit 64 is relatively fully opened permitting the pressure in the area of the annular groove 31 to act upon or above the membrane within the area 63 thus tending to limit further upward movement of the diaphragm at this point which in undesirable. Without this feature, the membrane would rise further and during the closing action hereinafter to be described, would cause turbulence and noisy operation due to insufficient back pressure. However, with this particular valve, the portion of the membrane above the rib 30 and outboard thereof moves down relatively quickly during the closing action to restrict the flow between the membrane and the rib 30 thus preventing turbulence. It should be remembered that the membrane is urged downwardly at all times by the formation thereof as hereinbefore described and clearly illustrated in FIG. 8.

As the water level rises in the tank, the float rises thus lifting connecting rod 19 and rotating arm 39 in an arc in the direction of arrow 65. This also rotates the spherical cam 43 in the same direction thus forcing the plug 41 downwardly against the center of the membrane 50 of the diaphragm 33. As this downward movement progresses, the membrane restricts the flow across the rib 30 (assisted by the formation of the membrane) thus causing a build-up of pressure in the area bounded by the rib 30. This build-up of pressure produces a force which opposes the downward movement of plug 41, sufficiently to cause the lever of arm 39 to retard its rotation slightly until the float 18 is subject to sufficient upward buoyancy as the water level continues to rise, to overcome this pressure build-up and also to overcome the result of increased friction between the spherical cam surface 47 and plug 41. When these pressures are overcome, the membrane is moved rapidly to the closed position eliminating noise, turbulence and "wire drawing".

A slit 66 formed in the membrane substantially opposite to the valve 64, but situated inboard of the rib 30, leaks some water through the membrane to the area above the membrane which tends to reduce the effective upward force of the membrane against the plug 41. At this nearly closed position, such leakage through this slit 66 is possible, while in the more open position as illustrated in FIG. 2, the upper face of the membrane in the area of the slit is in a state of compression due to the degree of flexing that occurs near the outer area of the membrane so that such leakage is prevented.

Figure 12:
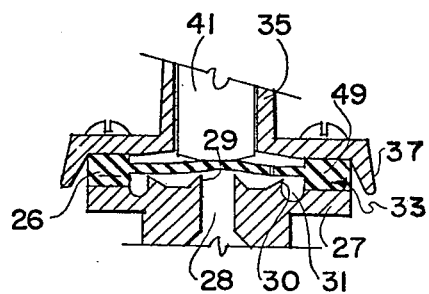
FIG. 12 is a view similar to FIG. 11, but showing the diaphragm in the nearly closed position.

At the nearly closed position illustrated in FIG. 12, the variable slit or valve 64 is closed as the flexing action is at a minimum and the leakage through slit 66 hereinbefore mentioned, results accordingly in a pressure build-up above the membrane. This build-up exerts a downward thrust over the entire surface of the membrane including the area over the annular channel 31, the pressure in the latter area becoming relatively insignificant with the valve almost closed, and resulting in a net downward force on the membrane over the channel 31 against the rib 30. At the same time, the upward force exerted on that portion of the diaphragm bounded by the rib 30 is reduced so that the necessary rise of water level in the tank to achieve the final rapid closing by the float, is reduced.

FIG. 3 shows the valve action in the closed position with the portion 48 of the spherical cam forcibly holding the plug 41 against the membrane of the diaphragm which in turn has its lower face held tightly against the valve seat 29. As the lever or arm 39, the cam 43 and the plug 41 move from the positions illustrated in FIG. 2 to the positions illustrated in FIG. 3, the edge or junction 48 of the cam bearing against the upper surface of the plug 41 progressively moves towards the center of this upper surface thereby effectively reducing the resistance arm through which the forces of the water acting against the diaphragm, are able to act. As the valve approaches more and more the fully closed position, the resistance to closing increases. Simultaneously, the above progressive reduction of the resistance arm enables the float to overcome the increasing resistance and, at the nearly fully closed position, this action is responsible for the rapid closing or "snap" action once the back pressure and friction are over-balanced by the buoyancy of the float and it is this feature of the design that permits the valve to operate with a relatively short lever (approximately 2 ½ inches long).

The "effective resistance arm" is the horizontal distance between the outer edge of cam 19 bearing against the upper surface of plug 41, and a vertical line through the center of the inner tapered circular portion or seat 46 of the upper portion 26 of the body.

The non-spherical portion of the cam 43 is chamfered slightly on the portion thereof closest to the outboard end of the lever 39 so that when this lever or arm drops down and rests against the upper portion of the body at point 67, in FIG. 2, the cam does not force the plug downwardly. Relatively silent operation is provided by the shape and formation of the annular groove 31 which is preferably semi-circular thus reducing turbulence by allowing the tumbling of water. Furthermore, the balancing of the outer flow is occasioned by the plurality of radial slots or grooves 52 within the underside of the mounting portion of the diaphragm and finally, the underside or lower face of the plug 41 is chamfered at the edge thereof to permit the correct flexing of the membrane of the diaphragm for quiet operation.

FIGS. 9 and 10 show an alternate design of the diaphragm 33 and where common parts occur, similar reference characters have been given, but with the suffix "A" added.

In this embodiment, the pressure release valve or means 66 and the pressure adjusting valve 64, have been replaced by a flap valve assembly collectively designated 67 operating within an orifice or port 68 formed in the membrane.

This flap valve and the orifice are formed by partially cutting a circle through the membrane thus leaving a valve flap 69 hinged along the uncut line shown by reference character 70. A projection 71 is formed on the upper surface and an extension 72 is formed on the under surface to limit the upward movement of the flap 69.

In this embodiment and on application of water under pressure through the threaded connection 13, the membrane of the diaphragm moves upwardly until the upper face of the plug 41 engages the spherical cam 43 and the lower face of the plug engages the projection or lug 71 of the flap valve 67 which is normally in the closed position. Upward movement of the membrane has been facilitated by the free exhaust of water from the region above the membrane through a groove or port 73 formed on the upper side of the mounting portion 49 and shown clearly in FIGS. 9 and 10.

As soon as the valve flap 69 is forced downwardly by the engagement of the plug with the projection 71, water flows freely through the orifice 68 into the region above the membrane thereby reducing the pressure difference across the latter sufficiently to arrest further upward movement. In this connection, the groove 73 does not have sufficient capacity of flow to prevent pressure build-up above the membrane with valve 67 partially opened.

When the float moves upwardly due to buoyancy, plug 41 moves downwardly and opens valve 67 fully thus effecting an even greater reduction of the pressure difference across the membrane. This upward force is thus reduced allowing the membrane to move downwardly so that very little force on the plug 41 is required especially in view of the tendency of the membrane to move downwardly in order to relax from its distended state as hereinbefore described.

Valve 67 remains open even to the fully closed position thus sustaining pressures in the region above the membrane until complete shut-down. This pressure becomes substantially greater than that in the annular groove or cavity 31 as the restriction increases between the membrane and the rib 30 and this results in a downward force on the membrane over the annular groove or cavity 31 which increases the restriction even more so. This causes a pressure build-up in the area below the diaphragm membrane bounded by the rib 30. The flow through valve 67 and groove 73 increases accordingly and the pressure differences across the membrane are correspondingly increased. This produces a resistance to the downward travel of the plug and once again the float is retarded in its upward travel until sufficient buoyancy is provided by the rising water level in the tank.

At this point, the plug is forced downwardly thus throttling off the water with a "snap" action so that the above forces on the diaphragm are dissipated and the valve moves quickly to the fully closed position. It is believed that the pressures discussed above in the area above the membrane are considerably higher than those experienced with the diaphragm described in the first embodiment.

On the next filling cycle, the float drops down thus releasing the downward force on the plug 41 so that the membrane rises sufficiently to commence flowing water, part of which passes through valve 67 and the pressure difference across the latter as well as the elimination of the downward force of plug 41, causes valve 67 to close and the diaphragm progresses again to the fully opened position as hereinbefore described.

The aforementioned extension or rim 72 maintains a tight seal of the orifice 68 in the diaphragm as it distends in progressing to the open position.

It will be noted that a vane shaped member 74 is provided in the threaded conduit 13 below the bore 28 and the seat 29 which prevents the incoming jet of water from impinging directly on the diaphragm through the orifice or bore 28 leading to the seat. This jet is erratic in its behaviour which, without the provision of this vane 74, strikes the side walls of the housing part of the time and passes directly through the throat at other times striking forcefully against the diaphragm. This causes varying pressures in the area underneath the membrane of the diaphragm thus resulting in fluctuating flow rates and some turbulence in the water supply system. Vane or vanes 74 smooth out the flow and prevent direct impingement of water onto the diaphragm membrane.

The base of the conduit 13 is tapered slightly (not illustrated) and the sides of the vane are also tapered so that the vane is held in position by a wedging action although other methods of securement may, of course, be used.

Reference should once again be made to the attachment of the float and support thereof. Several apertures or holes are provided in the flexible strip 21 adjacent the distal end thereof so that the connecting rod 19 and the float 18 can be positioned approximately vertically and the float is clear of any other components within the tank throughout its travel. The collar 20 is provided with a threaded upward end which passes through one of these holes and the float is screwed onto the collar to retain this support is engagement with the collar. The vertical adjustment of the collar 20 on the connecting rod 19 through the thumb screw 75, controls the water level within the tank.

Figure 9A:
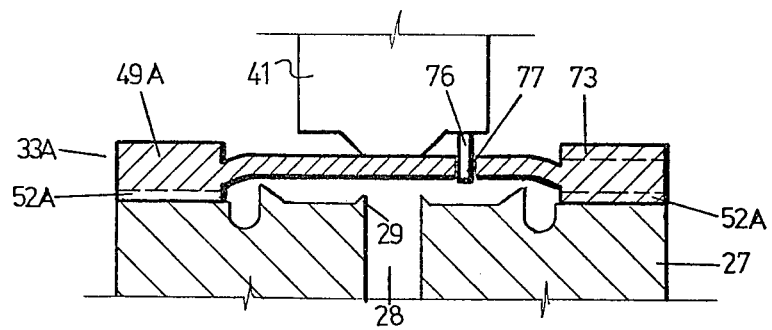
FIG. 9A is a fragmentary partially schematic cross section of the diaphragm of FIG. 9 in the open position but showing a modified valve construction.

Reference should next be made to FIG. 9A which shows a variation of the diaphragm shown in FIG. 9.

Instead of the valve 67, a relatively short cylindrical pin 76 is relatively loosely mounted through a cylindrical drilling 77 through the web of the diaphragm.

The principle of operation is similar to that described for the flap valve 67 and is used for adjusting the pressure differential above and below the diaphragm and to ensure that the "snap" action is obtained.

The pin 77 rides freely but with little clearance in the aperture in the membrane of the diaphragm and as the water leaves the tank, the float lowers and the cam is rotated so that the force on plug 41 is removed. The diaphragm lifts off seat 29 by the inlet water pressure and a pressure build-up below the membrane causes flow past pin 77 and finally through port 73 to the exterior of the diaphragm.

As the membrane deflects as shown in FIG. 9A, the aperture 77 deflects and allows the passage of water past the pin to the other side of the membrane. Water continues to flow through the aperture until the pressure differential across the membrane produces just enough force to keep the membrane in the distended state.

When the float rises as the tank refills, plug 41 moves the pin and the membrane downwardly so that the membrane moves towards the valve seat 29.

At this point, the pressure above the membrane exerts a thrust over the annular channel outside of rib 30 which is now at low pressure because of the reduced flow rate. This causes a pressure build-up in the area confined by the rib thereby resisting further travel of the plug 41 until the buoyancy of the float builds up sufficiently to overcome this resistance and thrusts the plug and the membrane firmly onto seat 29 to shut off the valve with a "snap" action. At this moment of course all water flows collapse and all pressures downstream of the seat 29 are dissipated.

Dealing next with the improvements shown in FIGS. 13 to 17 inclusive, it should be stressed that one of the important characteristics of the present device is the combination mechanical and hydraulic forces which act upon the diaphragm and moves same towards the closed or shut-off position.

By adjusting the pressure differential between each side of the diaphragm, a relatively short lever can be used between the cam and float thus permitting mounting of the device on the overflow tube of the flush valve where it is of course above the water level and is the only way of guarantying a completely anti-siphon installation every time, a requirement of the majority of plumbing codes in most areas.

Figure 13:
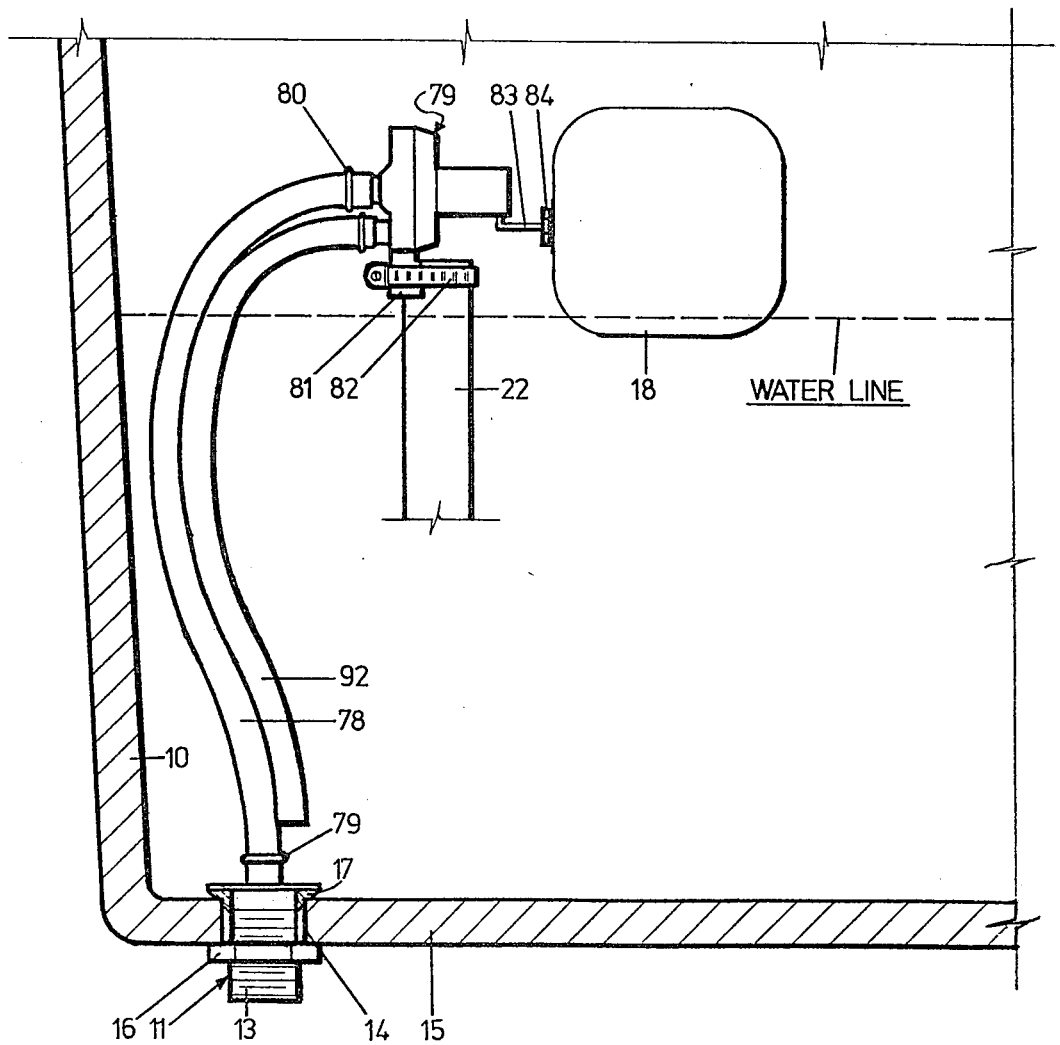
FIG. 13 is a view similar to FIG. 1 but showing the valve assembly of FIGS. 14–17.

Reference should first be made to FIG. 13 in which similar numbers have been given parts corresponding to those illustrated in FIG. 1.

Water under pressure passes into the tank via the threaded connecter 13 into a flexible tubing 78 which is sealed onto the inner end of the connection 11 by means of a clamp 79.

This tubing 78 is also connected by the other end thereof to the valve collectively designated 79, by means of a further clamp 80. The valve 79 includes an attaching portion 81 by which the valve is secured to and supported upon the upper end of the overflow tube 22, by means of adjustable clamp 82 as clearly illustrated.

The float 18 is attached to the distal end of lever 83 by means of a screw 84 held captive by the flattened distal end 85 although of course other methods of attachment of the float to the lever 83 may be utilized.

Figure 14:
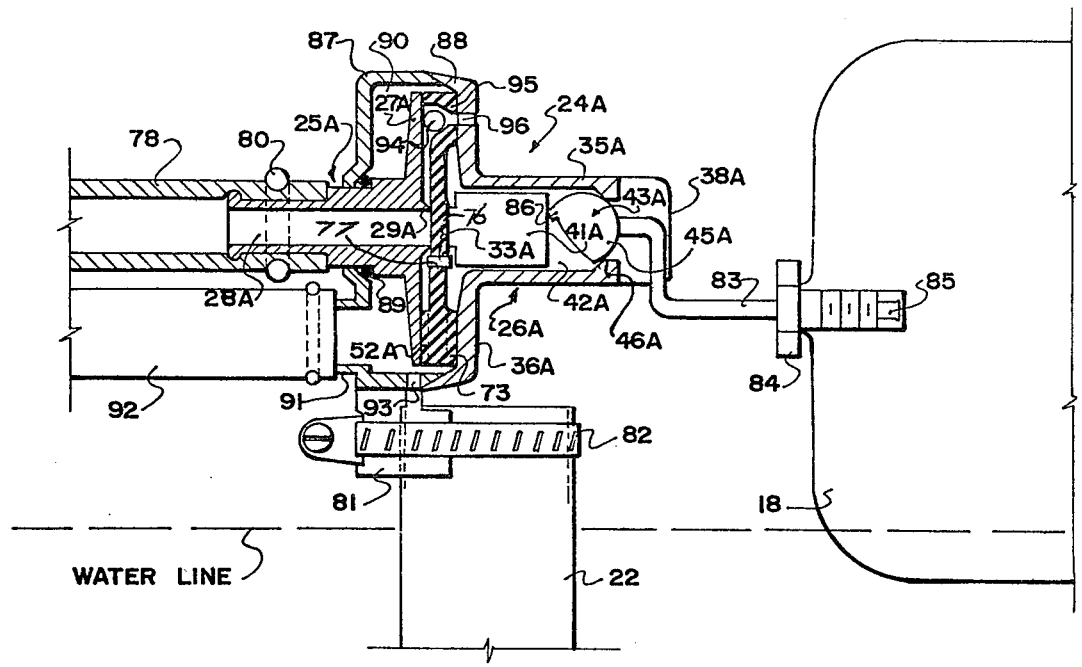
FIG. 14 is an enlarged fragmentary cross sectional view of an alternative embodiment of the valve assembly in the closed position.

Referring next to FIG. 14, the parts of the valve assembly which correspond to parts hereinbefore described, have been given similar reference numbers but with the suffix "A" attached thereto.

A spherical cam 43A is secured to the inner end of lever 83 and bears within the cam seat 46A formed within the second portion 35A of the housing and it is desired that the seal between the spherical surface of the cam and the seat be sufficient to prevent leakage of water therepast or, if such leakage does occur, to maintain such leakage at a minimum so that pressure differentials can be obtained as will hereinafter be described.

The plug or plunger 41A is acted upon by the peneplain surface of the cam together with a small projection 86 formed upon one side of the cam and the junction between the peneplain surface and the spherical surface as clearly illustrated. This projection gives additional leverage for actuation of the plug 41A as the float rises.

When the float is in the uppermost position illustrated in FIG. 14, the plug or plunger 41A is forced to the left with respect to the drawings, and bears against the diaphragm 33A which is similar to the diaphragm shown in FIG. 9A. The plunger 41A holds the diaphragm firmly upon valve seat 29A and of course shuts off the flow of water from tube or conduit 78 which is connected to the inlet portion 28A of the first housing portion 25A.

An outlet housing 87 is adhesively secured to the mating end of the second or cap housing 26A at the junction 88 and is sealed to the first housing 25A either adhesively or by means of an O ring 89 surrounding the inlet portion as clearly shown in FIG. 14.

This outlet housing 87 forms a circumferential outlet space or area 90 which communicates with an outlet 91 to which is attached an outlet conduit or tube 92 which is also flexible and which terminates adjacent the base of the tank 15 as clearly illustrated in FIG. 13.

When the flush valve is actuated in the normal way, the water discharges from the tank and the float 18 pivots downwardly rotating the cam 43A so that the plug 41A is no longer held forceably against the diaphragm. Water under pressure therefore passes through the inner or first housing 25A, past the seat 29A and into the space between the flange 27A and the diaphragm 33A.

It then passes radially outwardly through radial slots 52A to the space or area 90 enclosed by the one end of the cap housing 26A and the outlet or secondary housing 87 hereinbefore described. The water then passes through the connection 91 to the outlet tube 92 and thence to the tank.

The pressure built up on the left side of the membrane with reference to FIG. 14, causes the flow through the valve or aperture 77 within the membrane (see FIG. 9A), into the area or space on the opposite side of the membrane. Because this space is substantially sealed by the cam 43A bearing against cam seat 46A, pressure builds up in this space and causes flow through a bleed orifice 73 which, this embodiment, is formed in the periphery of the diaphragm.

However it will be appreciated that this orifice can be formed in the inner surface of the cap housing 26A. This discharges into the space 90 and ultimately into the tank via the conduit 92. This bleed orifice or groove 73 maintains the pressure on the righthand side of the diaphragm somewhat less at all times than the pressure on the lefthand side of the diaphragm so that the membrane of the diaphragm is subject to a hydraulic force to the right with reference to drawings, overcoming the flexural resistance of the membrane and keeping it away from the seat.

As the float rises, lever 83 is rotated in a counterclockwise direction with reference to the drawings, causing the cam 43A to thrust the plug 41A against the diaphragm overcoming the hydraulic force on the membrane and moving the membrane to the left.

As the membrane approaches the seat, the discharge is progressively throttled thereby reducing the pressure in all areas downstream from the seat 29A. This gradually reduces the hydraulic force across the membrane, which reduction, along with the progressively greater mechanical advantage gained by the float as it rotates the cam so that the cam lobe 86 moves towards the center of the plug, permits the float, near the end of its travel, to seat the membrane upon the valve seat 29A with a positive "snap action".

The valve in the membrane consisting of pin 76 and aperture 77 should not be considered as simply a restricted orifice because it varies its effective opening according to the position of the membrane. When the float has dropped down and the cam is in the fully opened position, the cam lobe 86 is at the position of least mechanical advantage, ie. the resistance arm is at its maximum. Under these circumstances, the diaphragm distends to the right stretching the aperture 77 within which pin 76 is retained thus allowing a greater flow through what is an effectively larger opening. This allows a greater pressure build-up on the right side of the membrane although still less than the pressure on the opposite side thereby reducing the effective hydraulic force on the membrane so that the float can operate the cam and thrust the plug to the left with reference to FIG. 14, without excessive sinking of the float when it is first buoyed up by the rising water level within the tank.

As the membrane moves leftward, the membrane is less and less distended so that the effective opening of this valve 76 and 77 within the membrane, becomes less and less. Only as the membrane approaches the end of its travel does the pressure downstream from the valve seat 29A fall off and permit the snap action closing hereinabove described.

The supply of water to the trap of the toilet bowl (not illustrated) is obtained through an opening 93 in the outlet housing 87 immediately above the attaching portion 81 of the valve housing and this discharges directly into the overflow tube.

It should also be noted that a check ball 94 engages a seat 95 formed through the periphery of the diaphragm and aligned with a drilling 96 formed through the cap housing 35A. This check ball engages the seat when the valve is opened thereby preventing release of water through the drilling 96 and is unseated thereby allowing entry of air when the valve shuts off to preclude any possibility of back siphoning of water from the tank through opening 93 if due to some malfunction, water levels were raised above the top of the overflow tube 22 and the opening 93. Such a malfunction as a defective float would cause extraordinarily high water levels.

Figure 15:
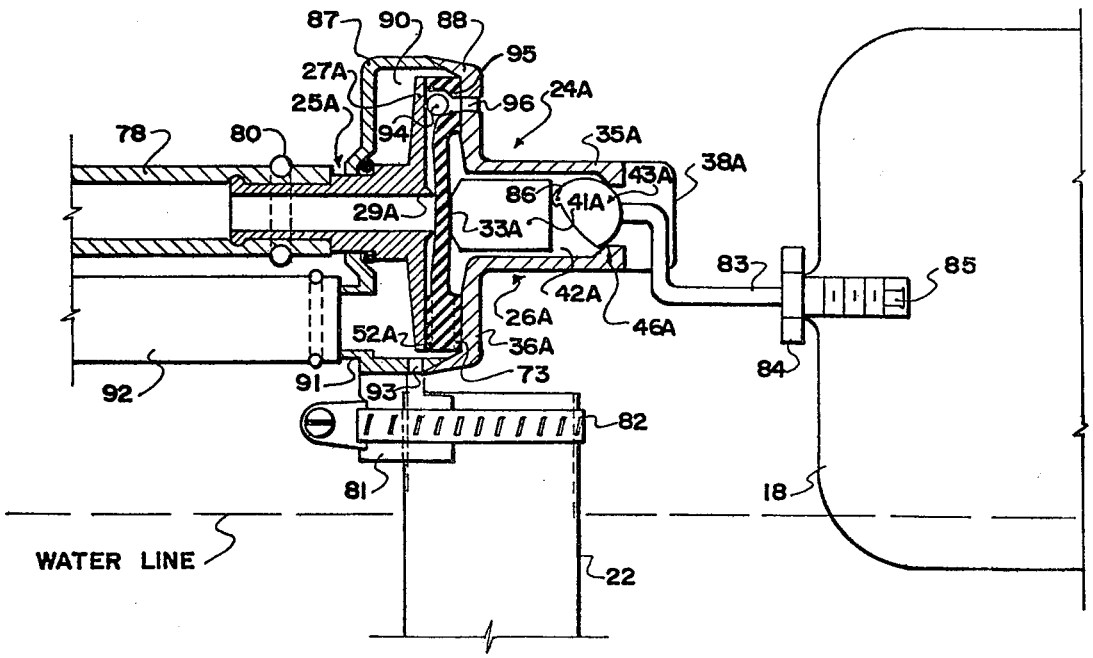
FIG. 15 is an enlarged fragmentary cross sectional view of a further alternative embodiment of the valve assembly in the closed position.
Figure 16:
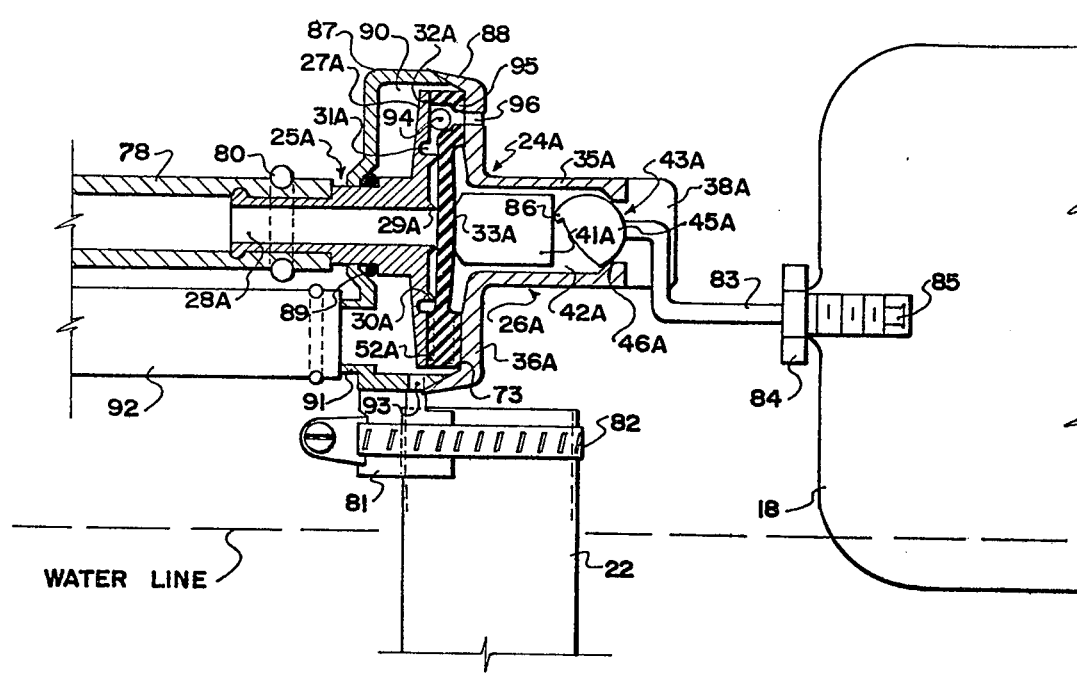
FIG. 16 is an enlarged fragmentary cross sectional view of the preferred embodiment of the valve assembly in the closed position.
Figure 17:
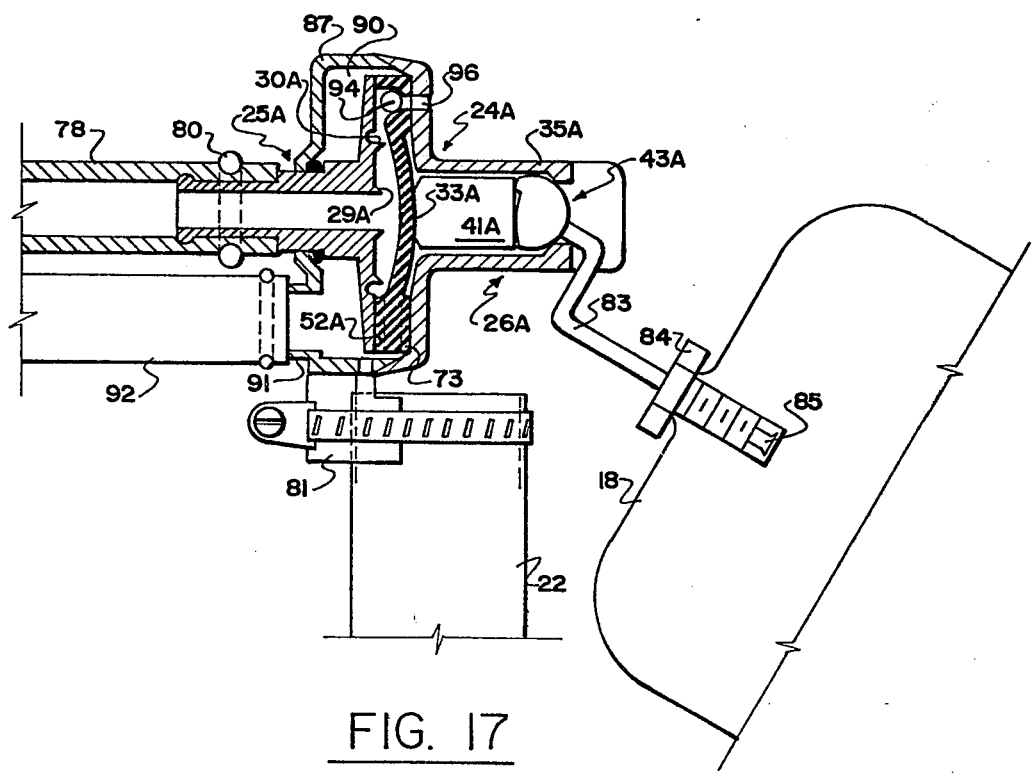
FIG. 17 is a view similar to FIG. 16 but showing the valve in the open position.

The device illustrated in FIG. 15 is similar to that shown in FIG. 14 so that corresponding reference characters have been given.

However it will be noted that the pin and aperture 12, 76 and 77 have been eliminated in this particular embodiment.

This embodiment includes means for building up pressures on the side of the membrane or diaphragm opposite from the valve seat 29A which assists the float in moving the membrane towards the closed position thereby making a relatively short float lever 83, feasible.

In this variation, the build-up of pressure is achieved in the outer casing and communicated from there through a passageway to the side of the membrane remote from the valve seat 29A thereby eliminating the necessity of the valve in the membrane.

The radial slots 52A are made slightly larger in this embodiment and water passes from the inlet, outwardly through these slots to the area of space 90 as hereinbefore described and thence to the outlet 91 and the outlet tube 92.

The pressure build-up in the secondary housing or area 90 is transmitted into the space on the opposite side of the membrane through the aforementioned slit 73 formed across the perimeter of the diaphragm or, alternatively, formed in the cap housing adjacent this area.

The hydraulic pressure is greatest in the space surrounding seat 29A and a pressure drop occurs through the radial slots 52A so that the pressure in the secondary housing or space 90 is somewhat less. As outlined above, communication between the space on the plug side of the diaphragm and the secondary housing space 90 is obtained by the radial slot or slit 73 and because there are only minimal flows between these two spaces, the pressure in these two spaces are for practical purposes equal. The membrane then moves to the right with reference to FIG. 15 because the pressure is lower on the right side and a small flow of water passes from the membrane area, through slit 73 into the area or space 90 as it is displaced by the membrane moving to the right. An insignificant amount leaks at all times between the cam and its seat while the valve is open.

The hydraulic force acting across the membrane is proportional to the pressure of the water supply to the valve. The greater the pressure the greater the flows through radial slots 52A and the greater the pressure difference between the seat area and the secondary housing space 90 and hence the greater the force acting across the membrane. In other words the membrane opens more and more as the supply pressure is increased. For any given water supply pressure the membrane moves to the right until its flexural resistance equals the hydraulic force acting over its surface. The effective opening provided by radial slots 52A governs the magnitude of the pressure difference acting across the diaphragm. The greater the opening the less difference in pressure and the lower the hydraulic force. By correctly sizing slots 52A, the force required to thrust plug 41A towards the closed position is small thereby enabling the float to rotate the lever 83 without excessive displacement.

This is perhaps the simplest design possible but has a drawback of producing insufficient flows at lower water pressures due to the omission, in the embodiment, of the annular rib 30 which is due to the fact that at low pressure, as the membrane leaves the seat, the build-up of pressure on the valve seat side of the membrane is low so that only minor flows occur. The pressure in the space immediately surrounding the seat is only slightly higher than it is in the space downstream from the radial slots of the diaphragm and hence in the space on the opposite side of the membrane. This means that there is very little pressure difference across the membrane so that it is deflected from the seat only slightly.

However for normal operating pressures, this embodiment is satisfactory.

The preferred embodiment is therefore shown in FIGS. 16 and 17 and once again similar parts have been given similar reference characters.

In this embodiment, the aforementioned annular rib 30A is incorporated together with the annular U-shaped channel 31A outboard of the rib.

As the membrane of the diaphragm is moved towards the valve seat 29A, it comes into close proximity or in contact with the annular rib 30A as hereinbefore described.

When the flush valve is actuated, water discharges from the tank and the float moves downwardly rotating the cam 43A so that the plug 41A is no longer held against the membrane. Water under pressure passes through the inlet 28A, past the valve seat 29A and into the space bounded by the rib 30A and the membrane. Flow of water through the narrow space between the membrane and the rib 30A is restricted in part causing a pressure build-up in the space bounded by the rib which distends the membrane thereby in turn permitting greater flow because of the increased clearance between the membrane and the rib.

The flow into the annular channel 31A outboard of the rib increases and the pressure build-up in this area causes flow through the radial slots 52A of the diaphragm periphery which, in turn, builds up pressure in the space 90 defined by the housing 87 which of course is sealed engagement with the cap housing 35A as hereinbefore described.

This pressure build-up in the outer casing is transmitted through the radial slit 73 to the space on the opposite side of the membrane and opposes the hydraulic force build-up in the area of the valve seat side of the membrane. Because only minimal flows occur through radial slit 73 consisting of the volume of water displaced by the membrane as it moves to the right with reference to FIG. 16 and a similar volume restored through the slit as the membrane moves towards the closed position, along with the insignificant amount which leaks past the cam seat 46A, the pressures in the outer casing and the space on the righthand side of the membrane are, for all practical purposes, equal.

The pressure build-up on the right side of the membrane is sufficient to permit travel or movement of plug 41A towards the closed position, with relative ease. As the membrane nears the closed position, the pressure downstream from rib 30 falls off due to the restriction of flow between the membrane and the rib. As the membrane continues towards the closed position, the clearances at both the rib and the valve seat 29A are reduced so that the flow is throttled in both locations substantially to the same degree, thereby maintaining an approximately constant pressure and hydraulic force in the space bounded by the rib. Because the pressure downstream from the rib falls off progressively, the pressure on the opposite side of the membrane drops off so that slightly greater force is required to move the plug towards the closed position.

However as the cam rotates closer and closer towards the closed position, its mechanical advantage increases until at some point it overwhelms the hydraulic force and the float lever cam and plug drive the membrane rapidly to the fully closed position with the aforementioned "snap" action.

This design has advantages over prior designs hereinbefore described inasmuch as it provides relatively good flows at relatively low water pressures. This is because the pressure build-up in the space bounded by rib 30A produces a considerable hydraulic force which moves the membrane away from the rib to allow good flow. Because the perimeter of the rib is relatively long, only a slight movement of the membrane at the rib is required to effect a relatively large opening. In fact it has been found that movement of slightly more than 1/64 of an inch, produces an effective opening equal to a ¼ inch diameter hole.

Although the rib is shown in the drawings as being formed on the flange 32A, nevertheless it will be appreciated that, if desired, it can be formed on the diaphragm although manufacture may be slightly more difficult. However the operation would be similar.

Since various modifications can be made in my invention as hereinabove described, and many apparently widely different embodiments of same made within the spirit and scope of the claims without departing from such spirit and scope, is is intended that all matter contained in the accompanying specification shall be interpreted as illustrative only and not in a limiting sense.

What I claim as my invention is:

1. In a water closet tank which includes a float, connecting means extending from said float, an overflow tube in said tank and a water supply connection through the wall of said tank; the improvement comprising a float operated valve assembly in said tank, said valve assembly including a body, a valve seat in said body, means operatively connecting said water supply connection to said valve seat, outlet means in said body operatively connected with the interior of said tank, a valve action having an open position and a closed position, situated within said body and controlling the flow of water past said valve seat and into said tank, said valve action including a flexible disphragm mounted in said body and spanning said valve seat and engaging said valve seat when said valve action is in the closed position, means operatively connected to said connecting means to permit opening of and to close said valve action relative to said valve seat, said last mentioned means including mechanical means for moving said diaphragm and holding same onto said valve seat when said valve action is in the closed position and means to control the pressure of water on both sides of said diaphragm when said diaphragm is moved away from said valve seat thereby reducing the effective hydraulic pressure holding said diaphragm away from said seat and reducing the mechanical pressure from said mechanical means, required to move said diaphragm towards said valve seat, said last mentioned means including first means communicating between the space bounded by said diaphragm on the side thereof facing said valve seat and said outlet means, second means communicating between said space and the space on the opposite side of said diaphragm and said first and second means being positioned on the downstream side of the valve seat and both communicating with the outlet means.

2. The device according to claim 1 in which said means to control the pressure of water on both sides of said diaphragm, comprises pressure adjusting valve means in said diaphragm for hydraulic pressure adjustment in the region on the side of said diaphragm opposite to said valve 3. The device according to claim 2 which includes an annular rib and an annular channel formed in said body concentric with said valve seat, said annular channel being outboard of said rib, and pressure adjusting valve means in said diaphragm and outboard of said rib for pressure adjustment between the annular channel and the region on the side of said diaphragm opposite to said valve seat.

4. The device according to claim 3 in which said pressure adjusting valve means takes the form of a relatively short slit formed through said diaphragm, said slit, when viewed in cross section with said diaphragm in the substantially closed position, being wedge shaped with the wide portion of said slit being on the side of said diaphragm opposite to said valve seat whereby deflection of said diaphragm away from said valve seat widens the side of said slit facing said annular channel thereby opening said slit and providing a water passage between said channel and the region on the side of said diaphragm opposite to said valve seat.

5. The device according to claim 1 in which said valve assembly includes a body having a first portion and a second portion secured together, said mechanical means including a valve actuating plug reciprocal within said second portion of said body, and a dome shaped segment cam component connected to said connecting means, said cam component including a curved outer surface and a peneplain shaped inner face, means in said second portion of said body substantially sealably mounting said cam component for partial rotative movement in said second portion, said inner face engaging the outer side of said valve actuating plug when said valve action is in the open position and engaging said outer side of said plug adjacent the intersection of said inner face and the curved outer surface of the segment, when said valve action is in the closed position, said diaphragm including a perimetrical mounting portion, said diaphragm being mounted by said perimetrical mounting portion between said first and second portions of said body, said water connection being operatively connected to said first portion, said valve seat being formed on the inner end of said first portion, at least one water conducting channel communicating between said valve seat and the interior of the associated tank, said cam urging said valve actuating plug into engagement with the side of said diaphragm opposite to said valve seat and holding said diaphragm on said seat when in the closed position, the pressure of the water from said water supply connection lifting said diaphragm from said seat when said action is in the open position.

6. The device according to claim 5 which includes an annular rib situated between the inner end of said first portion and said diaphragm concentric to said valve seat and defining an annular cavity outboard of said rib, said rib acting as a restriction to said cavity when said diaphragm approaches the closed position upon said valve seat and permitting free flow from said valve seat to said cavity when said diaphragm moves away from said valve seat towards the open position.

7. The device according to claim 6 which includes a pressure adjusting means in said diaphragm, said pressure adjusting means comprising a valve in said diaphragm, said valve being substantially closed when said action is in the closed position and open when said action is in the open position, and water exhaust means extending from the area on the side of said diaphragm opposite said valve seat and communicating with the interior of the associated tank.

8. The device according to claim 5 which includes a pressure adjusting means in said diaphragm, said pressure adjusting means comprising a valve in said diaphragm, said valve being substantially closed when said action is in the closed position and open when said action is in the open position, and water exhaust means extending from the area on the side of said diaphragm opposite said valve seat and communicating with the interior of the associated tank.

9. The device according to claim 1 which includes a pressure adjusting means in said diaphragm, said pressure adjusting means comprising a valve in said diaphragm, said valve being substantially closed when said action is in the closed position and open when said action is in the open position, and water exhaust means extending from the area on the side of said diaphragm opposite said valve seat and communicating with the interior of the associated tank.

10. In a water closet tank which includes a float, connecting means extending from said float, an overflow tube and a water supply connection through the wall of said tank; the improvement comprising a valve assembly in said tank and operatively connecting to said water supply connection and to said connecting means, said valve assembly including a body having a first portion and a second portion secured together, a valve action within said body controlling the flow of water from said water supply connection to the interior of said tank, means operatively connected to said connecting means to permit opening of and to close said valve action, said means including a valve actuating plug reciprocal within said second portion of said body, and a dome shaped segment cam component connected to said connecting means, said cam component including a curved outer surface and a peneplain shaped inner face, means in said second portion of said body substantially sealably mounting said cam component for partial rotative movement in said second portion, said inner face engaging the outer side of said valve actuating plug when said valve action is in the open position and engaging said outer side of said plug adjacent the intersection of said inner face and the curved outer surface of the segment, when said valve action is in the closed position said valve action including a flexible diaphragm, said diaphragm including a perimetrical mounting portion, said diaphragm being mounted by said perimetrical mounting portion between said first and second portions of said body, said water connection being operatively connected to said first portion, said valve seat being on the inner end of said first portion, said diaphragm engaging said valve seat when said valve action is in the closed position, and being clear of said valve seat when in the open position, means to control the pressure of water on both sides of said diaphragm when said diaphragm is moved away from said valve seat thereby reducing the effective hydraulic pressure holding said diaphragm away from said seat and reducing the mechanical pressure from said mechanical means, required to move said diaphragm towards said valve seat, said last mentioned means including first means communicating between the space bounded by said diaphragm on the side thereof facing said valve seat and said outlet means, second means communicating between said space and the space on the opposite side of said diaphragm and said first and second means being positioned on the downstream side of the valve seat and both communicating with the outlet means an annular rib situated between said inner end of said first portion and said diaphragm concentric to said valve seat and defining an annular cavity outboard of said rib, said rib acting as a restriction to said cavity when said diaphragm approaches the closed position upon said valve seat and permitting free flow from said valve seat to said cavity when said diaphragm moves away from said valve seat towards the open position, at least one water conducting channel communicating between said annular cavity and the interior of the associated tank, said cam urging said valve actuating plug into engagement with the side of said diaphragm opposite to said valve seat and holding said diaphragm on said seat when in the closed position, the pressure of the water from said water supply connection lifting said diaphragm from said seat when said action is in the open position.

11. The device according to claim 10 in which said means operatively connected to said connecting means includes an arm moveably connected by one end thereof to one end of said connecting means and being connected by the other end thereof to said dome shaped segment cam, said connecting means moving substantially vertically with said float, said arm being moved in an arc by said connecting means.

12. The device according to claim 11 which includes a trap seal feed conduit assembly operatively connected between said body and said overflow tube and means to adjust the volume of the water flowing from said conduit to said overflow tube, said assembly including a hollow cylindrical boss extending outwardly from said second portion of said body and being connected by the inner end thereof with the downstream side of said valve action, an inner wall portion formed within said boss inclining inwardly towards the inner end of said boss, said conduit including a flexible tongue portion on the inner end thereof, said conduit being frictionally slidable within said hollow boss whereby said flexible tongue portion engages said inner wall, the degree of engagement of said conduit within said hollow boss controlling the cross sectional area of said inner end of said boss and thereby controlling the volume of water passing therethrough.

13. The device according to claim 10 which includes an annular channel situated at the inner end of said first portion concentric with said valve seat, and outside of said rib, and pressure adjusting valve means in said diaphragm and outboard of said rib for pressure adjustment between the annular channel and the region on the opposite side of the said diaphragm to the valve seat.

14. The device according to claim 13 which includes pressure release means formed in said diaphragm between the portion thereof engaging said valve seat and the portion thereof adjacent to said rib.

15. The device according to claim 14 in which said pressure adjusting valve means takes the form of a relatively short slit formed through said diaphragm, said slit, when viewed in cross section with said diaphragm in the substantially closed position, being wedge shaped with the wide portion of said slit being on the side of said diaphragm facing the said second portion whereby deflection of said diaphragm towards the said second portion widens the side of said slit facing the said first portion thereby opening said slit and providing a water passage between said channel and the region on the side of said diaphragm facing the said second portion.

16. The device according to claim 15 which includes a trap seal feed conduit assembly operatively connected between said body and said overflow tube and means to adjust the volume of water flowing from said conduit to said overflow tube, said assembly including a hollow cylindrical boss extending outwardly from said second portion of said body and being connected by the inner end thereof with the downstream side of said valve action, an inner wall portion formed within said boss inclining inwardly towards the inner end of said boss, said conduit including a flexible tongue portion on the inner end thereof, said conduit being frictionally slidable within said hollow boss whereby said flexible tongue portion engages said inner wall, the degree of engagement of said conduit within said hollow boss controlling the cross sectional area of said inner end of said boss and thereby controlling the volume of water passing therethrough.

17. The device according to claim 14 in which said pressure adjusting valve means takes the form of a relatively short slit formed through said diaphragm, said slit, when viewed in cross section with said diaphragm in the closed position, being wedge shaped with the wide portion of said slit being on the said opposite side of said diaphragm whereby deflection of said diaphragm from said seat widens said slit thereby opening said slit and providing a water passage between said channel and the region on the side of said diaphragm opposite said valve seat.

18. The device according to claim 14 which includes a trap seal feed conduit assembly operatively connected between said body and said overflow tube and means to adjust the volume of the water flowing from said conduit to said overflow tube, said assembly including a hollow cylindrical boss extending outwardly from said second portion of said body and being connected by the inner end thereof with the downstream side of said valve action, an inner wall portion formed within said boss inclining inwardly towards the inner end of said boss, said conduit including a flexible tongue portion on the inner end thereof, said conduit being frictionally slidable within said hollow boss whereby said flexible tongue portion engages said inner wall, the degree of engagement of said conduit within said hollow boss controlling the cross sectional area of said inner end of said boss and thereby controlling the volume of water passing therethrough.

19. The device according to claim 13 in which said pressure adjusting valve means takes the form of a relatively short slit formed through said diaphragm, said slit, when viewed in cross section with said diaphragm in the substantially closed position, being wedge shaped with the wide portion of said slit being on the side of said diaphragm facing said second portion whereby deflection of said diaphragm away from said valve seat widens the side of said slit facing the first portion thereby opening said slit and providing a water passage between said channel and the region on the side of said diaphragm opposite to the valve seat.

20. The device according to claim 19 which includes a trap seal feed conduit assembly operatively connected between said body and said overflow tube and means to adjust the volume of the water flowing from said conduit to said overflow tube, said assembly including a hollow cylindrical boss extending outwardly from said second portion of said body and being connected by the inner end thereof with the downstream side of said valve action, an inner wall portion formed within said boss inclining inwardly towards the inner end of said boss, said conduit including a flexible tongue portion on the inner end thereof, said conduit being frictionally slidable within said hollow boss whereby said flexible tongue portion engages said inner wall, the degree of engagement of said conduit within said hollow boss controlling the cross sectional area of said inner end of said boss and thereby controlling the volume of water passing therethrough.

21. The device according to claim 13 which includes a trap seal feed conduit assembly operatively connected between said body and said overflow tube and means to adjust the volume of the water flowing from said conduit to said overflow tube, said assembly including a hollow cylindrical boss extending outwardly from said second portion of said body and being connected by the inner end thereof with the downstream side of said valve action, an inner wall portion formed within said boss inclining inwardly towards the inner end of said boss, said conduit including a flexible tongue portion on the inner end thereof, said conduit being frictionally slidable within said hollow boss whereby said flexible tongue portion engages said inner wall, the degree of engagement of said conduit within said hollow boss controlling the cross sectional area of said inner end of said boss and thereby controlling the volume of water passing therethrough.

22. The device according to claim 10 in which said annular cavity is situated at the inner side of said first portion of said body concentric with said valve seat and outside of said rib and pressure adjusting valve means in said diaphragm, said pressure adjusting valve means comprising a relatively small valve formed in said diaphragm between said seat and said rib, said valve being normally closed and opening away from said plug, and a plug engaging projection on said valve facing toward said plug and extending beyond the plane of said diaphragm, and being engaged by the inner side of said plug whereby said valve is opened and water exhaust means extending from the side of said diaphragm opposite to said valve seat and communicating with the interior of said tank.

23. The device according to claim 22 which includes a trap seal feed conduit assembly operatively connected between said body and said overflow tube and means to adjust the volume of the water flowing from said conduit to said overflow tube, said assembly including a hollow cylindrical boss extending outwardly from said second portion of said body and being connected by the inner end thereof with the downstream side of said valve action, an inner wall portion formed within said boss inclining inwardly towards the inner end of said boss, said conduit including a flexible tongue portion on the inner end thereof, said conduit being frictionally slidable within said hollow boss whereby said flexible tongue portion engages said inner wall, the degree of engagement of said conduit within said hollow boss controlling the cross sectional area of said inner end of said boss and thereby controlling the volume of water passing therethrough.

24. The device according to claim 10 which includes a trap seal feed conduit assembly operatively connected between said body and said overflow tube and means to adjust the volume of the water flowing from said conduit to said overflow tube, said assembly including a hollow cylindrical boss extending outwardly from said second portion of said body and being connected by the inner end thereof with the downstream side of said valve action, an inner wall portion formed within said boss inclining inwardly towards the inner end of said boss, said conduit including a flexible tongue portion on the inner end thereof, said conduit being frictionally slidable within said hollow boss whereby said flexible tongue portion engages said inner wall, the degree of engagement of said conduit within said hollow boss controlling the cross sectional area of said inner end of said boss and thereby controlling the volume of water passing therethrough.

25. The device according to claim 10 in which said first means takes the form of at least one radially extending slot formed in the periphery of said diaphragm on the valve seat side of said diaphragm, said second means taking the form of at least one radial slit in the periphery of said diaphragm on the opposite side of said diaphragm, said slot and said slit both communicating with said outlet housing.

26. The device according to claim 10 which includes a pressure adjusting means in said diaphragm, said pressure adjusting means comprising a valve in said diaphragm, said valve being substantially closed when said action is in the closed position and open when said action is in the open position, and water exhaust means extending from the area on the side of said diaphragm opposite said valve seat and communicating with the interior of the associated tank.

* * * * *